US012472901B2

(12) United States Patent
Forero Rueda et al.

(10) Patent No.: US 12,472,901 B2
(45) Date of Patent: Nov. 18, 2025

(54) BELT SECUREMENT VERIFICATION SYSTEM

(71) Applicant: GM Global Technology Operations LLC, Detroit, MI (US)

(72) Inventors: Manuel Forero Rueda, Royal Oak, MI (US); Wonhee Michael Kim, Troy, MI (US); Paul W. Alexander, Ypsilanti, MI (US); Nilesh D. Mankame, Ann Arbor, MI (US); Kamran Ali, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 141 days.

(21) Appl. No.: 18/536,911

(22) Filed: Dec. 12, 2023

(65) Prior Publication Data

US 2025/0187560 A1      Jun. 12, 2025

(51) Int. Cl.
*B60R 22/48* (2006.01)

(52) U.S. Cl.
CPC ...... *B60R 22/48* (2013.01); *B60R 2022/4841* (2013.01); *B60R 2022/4866* (2013.01)

(58) Field of Classification Search
CPC ......... B60R 22/12; B60R 22/46; B60R 22/48; B60R 2022/4841; B60R 2022/4866; B60N 2/00; B60N 2/28
See application file for complete search history.

(56) References Cited

U.S. PATENT DOCUMENTS

| | | | | |
|---|---|---|---|---|
| 5,965,827 | A * | 10/1999 | Stanley | B60R 21/01556 73/862.391 |
| 2003/0226409 | A1 * | 12/2003 | Steele | G01L 5/103 73/862.391 |
| 2005/0172462 | A1 * | 8/2005 | Rudduck | F16B 21/06 24/606 |
| 2016/0339869 | A1 * | 11/2016 | Schmidt | B60R 22/023 |
| 2019/0299925 | A1 * | 10/2019 | Shi | B60N 2/2893 |
| 2021/0261806 | A1 * | 8/2021 | Kim | C09D 11/037 |

FOREIGN PATENT DOCUMENTS

| | | |
|---|---|---|
| DE | 102006027414 A1 | 12/2007 |
| DE | 602004011747 T2 | 2/2009 |
| EP | 1723012 B1 | 11/2006 |
| EP | 1896302 B1 | 7/2009 |

* cited by examiner

*Primary Examiner* — Van T Trieu
(74) *Attorney, Agent, or Firm* — Vivacqua Crane, PLLC (57) ABSTRACT

A belt securement verification system includes a belt and a securement verification device connected to the belt. When a tension force on the belt exceeds a threshold corresponding to a desired belt tightness or a desired belt slackness, the securement verification device moves from a first configuration to a second configuration to indicate to a user that the belt has achieved the desired belt tightness or desired belt slackness.

12 Claims, 7 Drawing Sheets

BELT SECUREMENT VERIFICATION SYSTEM

INTRODUCTION

The present disclosure relates to a belt securement verification system, and more particularly to a belt securement verification system that allows objective measurement and notification of the tightness and slack in a belt or harness.

Belts or harnesses are used in a wide variety of applications to secure cargo or passengers in vehicles. The desired degree of tension or tightness in the belt or the degree of slack in the belt varies between different use cases. For example, when securing cargo to a vehicle, it is desirable to have the belts under tension to provide tight securement of the cargo. When securing a passenger in a vehicle seat, such as a child restraint system, it is desirable to not have excessive slack while also limiting the tension in the belt. However, verification of the tightness or slack of the belts in a given securement setup is highly subjective and variable depending on the environment and the user.

Thus, there is a need for a belt securement system that allows a user to objectively ensure that the belt does not have excessive slack or that a desired belt tightness has been reached.

SUMMARY

A belt securement verification system is provided. In one example, the belt securement verification system includes a belt and a securement verification device connected to the belt, wherein when a tension force on the belt exceeds a threshold corresponding to a desired belt tightness or a desired belt slackness, the securement verification device moves from a first configuration to a second configuration to indicate to a user that the belt has achieved the desired belt tightness or desired belt slackness.

In one aspect, the securement verification device includes a first opening, a second opening, and a spring disposed between the first opening and the second opening, and the belt is disposed through the first opening and the second opening, and the spring is configured to move from the first configuration to the second configuration when the tension force on the belt exceeds the threshold corresponding to the desired belt tightness or the desired belt slackness.

In another aspect, the first opening is defined by a first frame and the second opening is defined by a second frame, and the spring is connected at one end thereof to the first frame and at another end thereof to the second frame such that the first frame is pivotally coupled to the second frame by the spring.

In another aspect, the first frame is angled with respect to the second frame when in the first configuration, and the first frame is planar with respect to the second frame when in the second configuration.

In another aspect, the spring is a helical torsion spring.

In another aspect, the spring is a beam having an elastic limit point traversal between a concave configuration when in the first configuration and a convex configuration when in the second configuration.

In another aspect, the securement verification device includes an elastic material coupled to the belt, wherein the elastic material is configured to move from the first configuration to the second configuration when the tension force on the belt exceeds the threshold corresponding to the desired belt tightness or the desired belt slackness, and when in the first configuration the elastic material hides a pictograph and when in the second configuration the elastic material shows a pictograph indicating that the desired belt tightness or desired belt slackness is achieved.

In another aspect, the securement verification device includes an elastic member disposed within a pocket of the belt and connected at one end thereof to the belt and at another end thereof to the belt, wherein the belt includes a pictograph on an outer surface of the belt between the ends of the elastic member, wherein the elastic member is configured to move from the first configuration to the second configuration when the tension force on the belt exceeds the threshold corresponding to the desired belt tightness or the desired belt slackness, and when in the first configuration the belt is folded to hide the pictograph and when in the second configuration the belt is unfolded to show the pictograph.

In another aspect, the securement verification device includes a flexible member disposed within a pocket of the belt, wherein the pocket includes at least one side opening, wherein the flexible member is configured to move from the first configuration to the second configuration when the tension force on the belt exceeds the threshold corresponding to the desired belt tightness or the desired belt slackness, and when in the first configuration the flexible member is disposed within the pocket, and when in the second configuration the flexible member extends out from the at least one side opening and is visible to a user.

In another aspect, the securement verification device includes a mechanophore material weaved into a portion of the belt, wherein the mechanophore material is configured to change from the first configuration to the second configuration when the tension force on the belt exceeds the threshold corresponding to the desired belt tightness or the desired belt slackness, and when in the first configuration the mechanophore material emits a first wavelength of light, and when in the second configuration the mechanophore material, in response to the tension force, emits a second wavelength of light different from the first wavelength of light.

In another aspect, the securement verification device includes piezoelectric film connected to a portion of the belt and a light emitting diode (LED) connected to the piezoelectric film, wherein the piezoelectric film and LED are configured to change from the first configuration to the second configuration when the tension force on the belt exceeds the threshold corresponding to the desired belt tightness or the desired belt slackness, and when in the first configuration the piezoelectric film does not produce an electric current, and when in the second configuration the piezoelectric film, in response to the tension force inducing a stress differential over the piezoelectric film, emits an electric current that illuminates the LED.

In another example, a belt securement verification system includes a belt and a securement verification device connected to the belt, the securement verification device having a first opening, a second opening, and a spring disposed between the first opening and the second opening. The belt is disposed through the first opening and the second opening, and the spring is configured to move from a first position to a second position when a tension force on the belt exceeds a threshold of the spring corresponding to a desired belt tightness or a desired belt slackness.

In one aspect, the first opening is defined by a first frame and the second opening is defined by a second frame, and the spring is connected at one end thereof to the first frame and at another end thereof to the second frame such that the first frame is pivotally coupled to the second frame by the spring.

In another aspect, the first frame is angled with respect to the second frame when in the first position, and the first frame is planar with respect to the second frame when in the second position.

In another aspect, the belt is disposed overtop the spring.

In another aspect, the spring is a helical torsion spring.

In another aspect, the spring is a beam having an elastic limit point traversal between a concave configuration when in the first position and a convex configuration when in the second position.

In another aspect, the beam is bi-stable.

In another aspect, the beam is mono-stable.

In yet another example, a belt securement verification system includes a child restraint seat, a belt connected to the child restraint seat, and a securement verification device connected to the belt, the securement verification device having a first opening, a second opening, and a spring disposed between the first opening and the second opening. The belt is disposed through the first opening and the second opening, and the spring is configured to move from a first position to a second position when a tension force on the belt exceeds a spring threshold corresponding to a desired belt tightness or a desired belt slackness.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
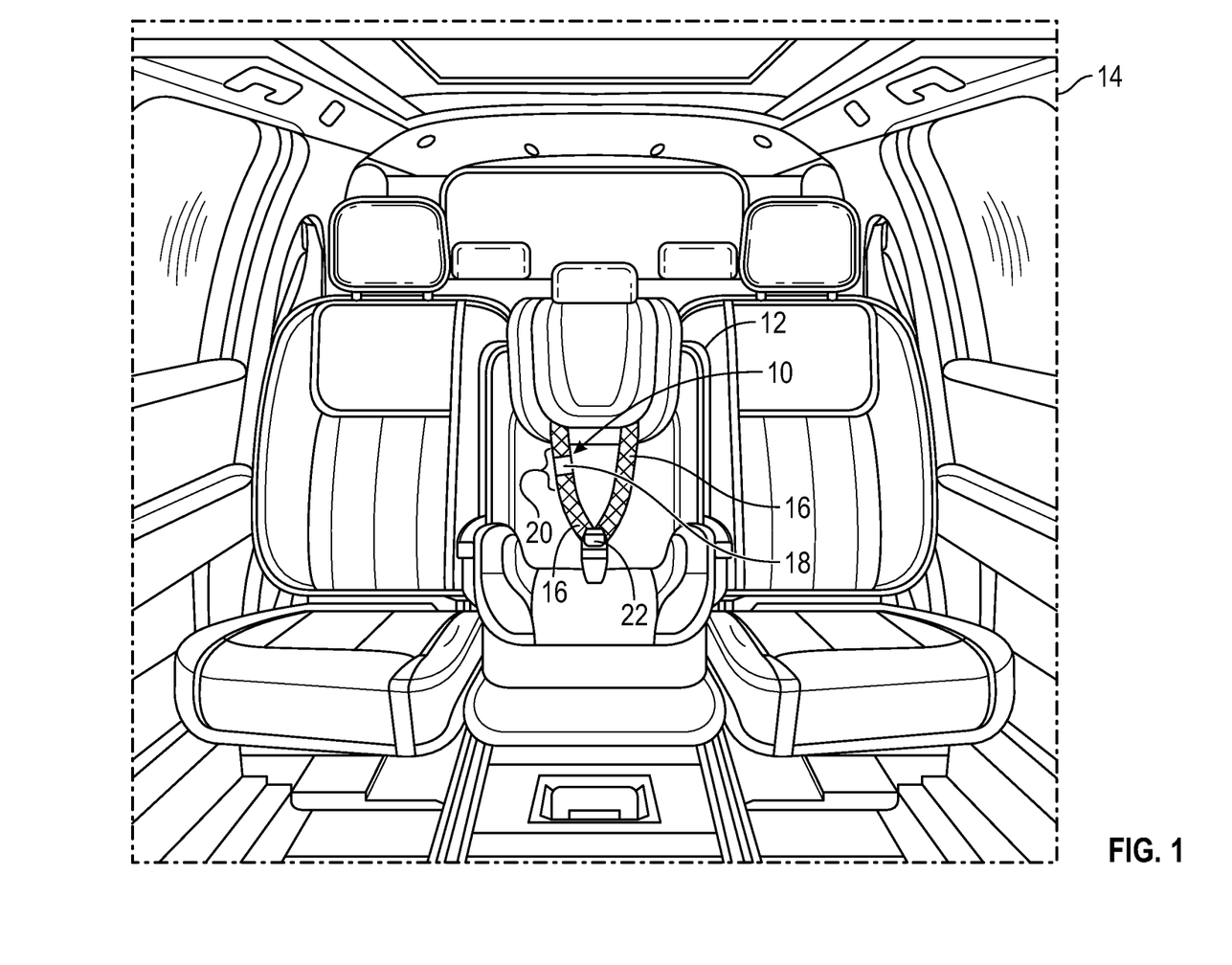
FIG. 1 is a belt securement verification system according to the principles of the present disclosure shown with an exemplary child restraint system in a vehicle.

Referring to FIG. 1, a belt securement verification system is shown and indicated generally by reference number 10. The belt securement verification system 10 is shown with an exemplary child restraint seat 12 in a vehicle 14. However, it should be appreciated that the belt securement verification system 10 may be used in any application that requires a belt or harness to secure a person, cargo, or equipment with either a desired tightness or a desired slackness of the belt or harness. For example, the belt securement verification system 10 may be used to secure cargo to a vehicle roof or truck bed, to secure passengers within a vehicle seat, to secure a load carrying harness to a user, etc. In the child restraint seat 12, it is particularly important that any belt or harness not have slack while also not being too tight. The belt securement verification system 10 includes a belt 16 and a securement verification device 18. In the example provided, the belt 16 is connected to the child restraint seat 12. The securement verification device 18 is connected to the belt 16 at an intermediate point 20 along the belt 16. The intermediate point 20 is spaced apart from a buckle 22 or other connecting point. Thus, the securement verification device 18 is able to verify tightness or slackness at a location of the belt 16 separate from the buckle 22. Generally, when a tension force on the belt 16 exceeds a threshold corresponding to a desired belt tightness or a desired belt slackness, the securement verification device 18 moves or changes from a first configuration to a second configuration to indicate to a user that the belt 16 has achieved the desired belt tightness or desired belt slackness.

Figure 2A:
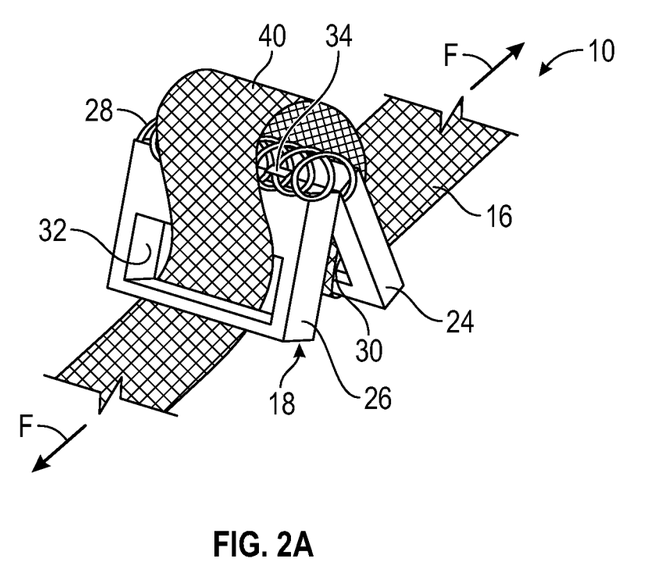
FIG. 2A is a perspective view of the belt securement verification system in a first configuration.
Figure 2B:
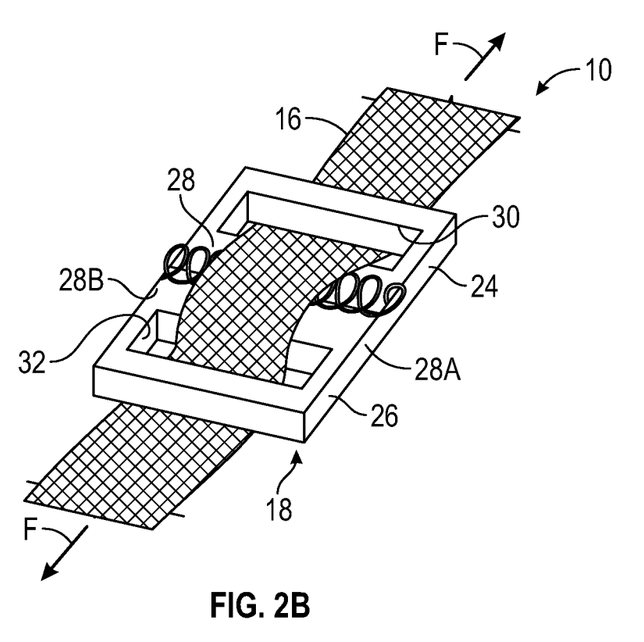
FIG. 2B is a perspective view of the belt securement verification system in a second configuration.

Turning to FIGS. 2A and 2B, the securement verification device 18 is illustrated in greater detail. The securement verification device 18 includes a first frame 24, a second frame 26, and a spring 28. The first frame 24 defines a first opening 30 that extends therethrough. The second frame 26 defines a second opening 32 that extends therethrough. The first frame 24 is pivotally connected to the second frame 26 by a hinge 34 or other flexible connection. The belt 16 extends through the first opening 30, overtop the spring 28, and through the second opening 32.

The spring 28 is disposed between the first frame 24 and the second frame 26 and has a first end 28A connected to the first frame 24 and a second end 28B connected to the second frame 26. In the example provided, the spring 28 is a helical torsion spring. The spring 28 exerts a torsion spring force on the first frame 24 and the second frame 26. The torsion spring force is set to a desired belt tightness force or desired belt slackness force, depending on the use application. The desired belt tightness force corresponds to a desired degree of tightness or tension in the belt 16. The desired belt slackness force is a desired degree of slack present in the belt 16, for example zero slack. The torsion spring force is therefore a threshold that, when exceeded, causes the spring 28 to move or bend, as will be described below.

The securement verification device 18 is moveable between a first configuration or position, shown in FIG. 2A, and a second configuration or position, shown in FIG. 2B. In the first configuration, a tension force "F" acting on the belt 16 is less than the threshold of the spring 28. The tension force F is defined as running longitudinally with respect to the belt 16. Thus, the spring 28 biases the first frame 24 and the second frame 26 to an angled position with respect to one another. This position creates a bulge 40 in the belt 16 above the spring 28 that is visible to a user, indicating that a desired belt tightness or belt slackness has not been achieved in the belt 16.

When the tension force F exceeds the threshold of the spring 28, the first frame 24 pivots with respect to the second frame 26 until the first frame 24 is planar with respect to the second frame 26. The belt 16 is drawn flat and the bulge 40 is eliminated, thus indicating that the desired tightness or desired slackness has been achieved in the belt 16.

Figure 3A:
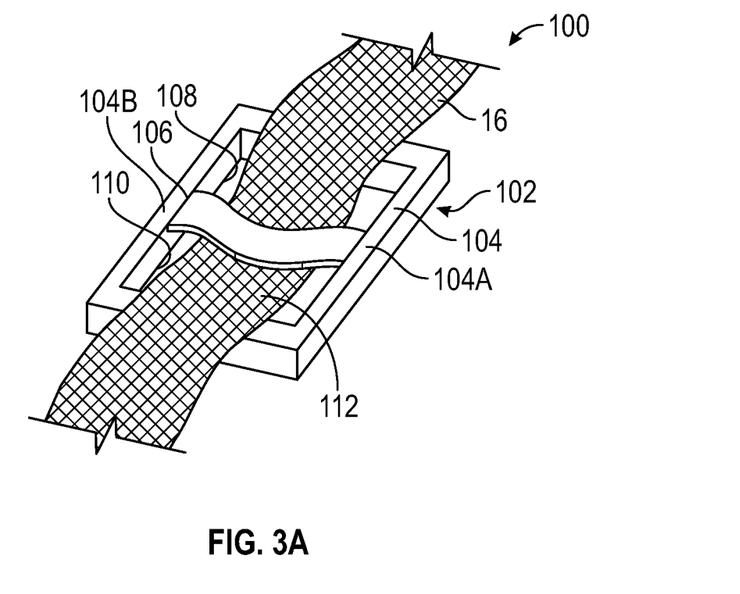
FIG. 3A is a perspective view of the belt securement verification system in a first configuration according to a second embodiment.
Figure 3B:
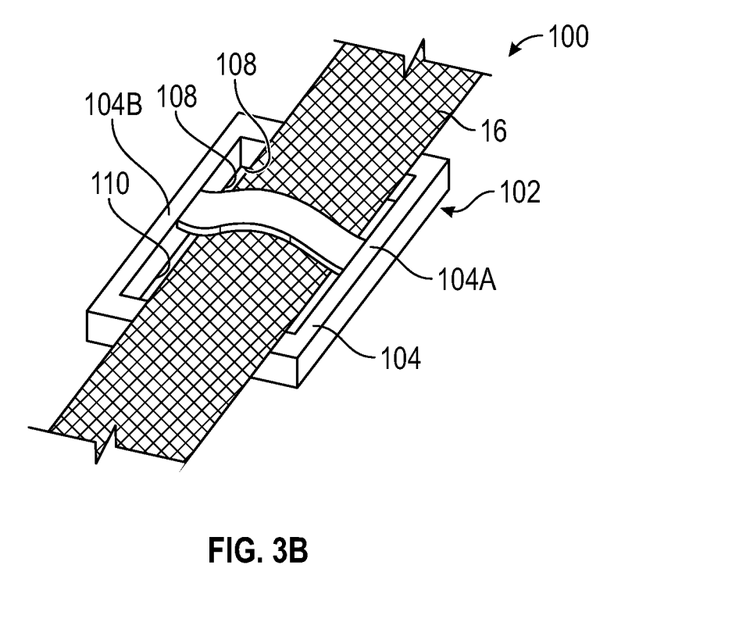
FIG. 3B is a perspective view of the belt securement verification system in a second configuration according to the second embodiment.

Turning to FIGS. 3A and 3B, another example of the belt securement verification system is shown and generally indicated by reference number 100. The belt securement verification system 100 includes the belt 16 and a securement verification device 102. The securement verification device 102 includes a frame 104 and a spring 106. The frame 104 and the spring 106 define a first opening 108 and a second opening 110 that extend therethrough. The belt 16 extends through the first opening 108, under the spring 106, and through the second opening 110.

The spring 106 is disposed between the first opening 108 and the second opening 110. In the example provided, the spring 106 is a bendable beam that extends from a first side 104A of the frame 104 to a second side 104B of the frame 104. The spring 106 has an elastic limit point traversal between a first configuration where the spring 106 is concave, shown in FIG. 3A, and a second configuration where the spring 106 is convex, shown in FIG. 3B. The elastic limit point traversal is set to a desired belt tightness force or desired belt slackness force, depending on the use application. The desired belt tightness force corresponds to a desired degree of tightness or tension in the belt 16. The desired belt slackness force is a desired degree of slack present in the belt 16, for example zero slack. The elastic limit point traversal is therefore a threshold that, when exceeded, causes the spring 106 to move or bend, as will be described below. In one example, the spring 106 is bi-stable and therefore maintains its position in the concave or convex configurations once the elastic limit point traversal has been passed.

As noted above, the securement verification device 102 is moveable between a first configuration or position, shown in FIG. 3A, and a second configuration or position, shown in FIG. 3B. In the first configuration, the tension force F acting on the belt 16 is less than the threshold of the spring 106. Thus, the spring 106 maintains the concave configuration shown in FIG. 3A and biases the belt 16 away from the frame 104. This configuration creates a bulge 112 in the belt 16 below the spring 106 that is visible to a user, indicating that a desired belt slackness has not been achieved in the belt 16.

When the tension force F exceeds the threshold of the spring 106, the spring 106 bends past the elastic limit point and moves to the second configuration where the spring 106 is convex, shown in FIG. 3B. In this convex configuration, the spring 106 moves out of longitudinal alignment with the belt 16 and exerts no force on the belt 16. The belt 16 is thus drawn flat and the bulge 112 is eliminated, indicating that the desired slackness has been achieved in the belt 16. In another example, the spring 106 is mono-stable and therefore the tension force F must exceed the threshold of the spring 106 to maintain the second configuration. In this embodiment, the belt securement verification device 102 can be used to verify the tightness of the belt 16.

Figures 4A, 4B, 4C:
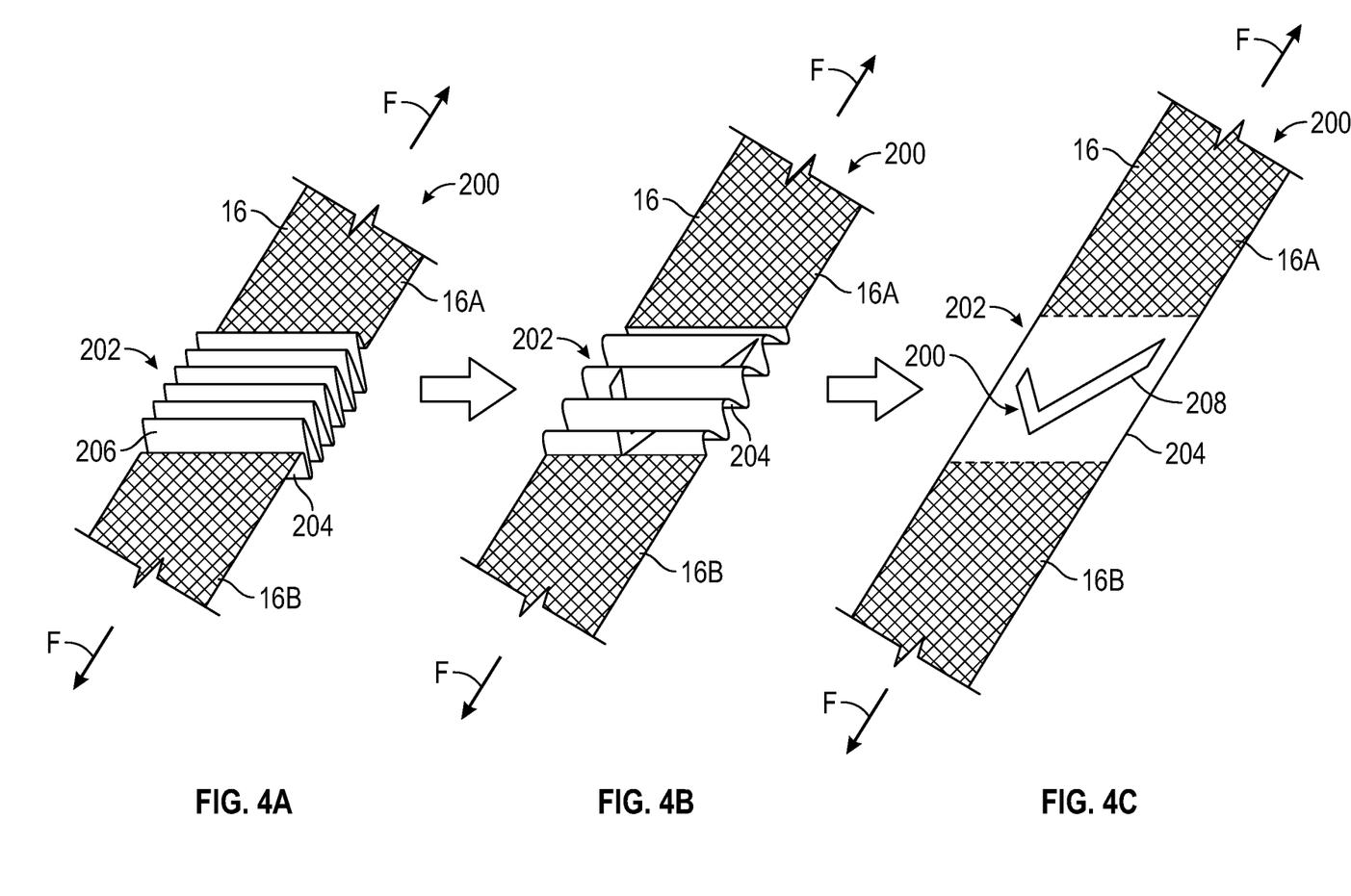
FIG. 4A is a perspective view of the belt securement verification system in a first configuration according to a third embodiment.
FIG. 4B is a perspective view of the belt securement verification system in transition configuration according to the third embodiment.
FIG. 4C is a perspective view of the belt securement verification system in a second configuration according to the third embodiment.

Turning to FIGS. 4A-4C, another example of a belt securement verification system is illustrated and indicated by reference number 200. The belt securement verification system 200 includes the belt 16 and a belt securement verification device 202 connected to the belt 16. The belt securement verification device 202 includes an elastic material 204 disposed in series and in-line with a first belt portion 16A and a second belt portion 16B. Alternatively, the elastic material 204 could be disposed in parallel with the belt 16. The elastic material 204 is stretchable when a force on the elastic material 204 exceeds a threshold. The threshold corresponds to a desired degree of tightness or tension in the belt 16 or a desired degree of slack present in the belt 16, for example zero slack.

When the elastic material 204 is not stretched (i.e., the tension force F is less than the threshold), the elastic material 204 is folded on itself in a first configuration, as shown in FIG. 4A. In the first configuration, a top surface 206 of the elastic material 204 is obscured from view of a user by the folds. When the tension force F exceeds the threshold, the elastic material 204 stretches, moving through a transition configuration shown in FIG. 4B, to a second configuration shown in FIG. 4C. In the second configuration, the elastic material 204 is flat and no longer folded. Thus, the top surface 206 is viewable by a user. In one example, the top surface 206 includes a pictograph 208 indicative that the belt 16 has achieved the desired tightness or slackness.

Figure 5A:
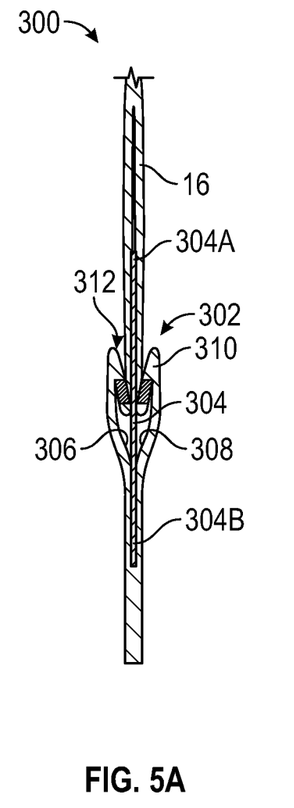
FIG. 5A is a side cross-section view of the belt securement verification system in a first configuration according to a fourth embodiment.
Figure 5B:
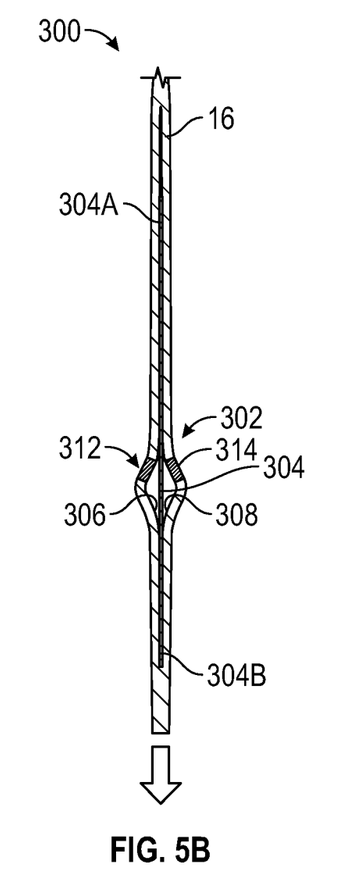
FIG. 5B is a side cross-section view of the belt securement verification system in a second configuration according to the fourth embodiment.

Turning to FIGS. 5A and 5B, another example of a belt securement verification system is illustrated and indicated by reference number 300. The belt securement verification system 300 includes the belt 16 and a belt securement verification device 302 connected to the belt 16. The belt securement verification device 302 includes an elastic member 304 disposed in series and in-line within a pocket 306 of the belt 16. A first end 304A of the elastic member 304 and a second end 304B of the elastic member 304 are each connected to an inside surface 308 of the belt 16 within the pocket 306. The elastic member 304 is stretchable when a force on the elastic member 304 exceeds a threshold. The threshold corresponds to a desired degree of tightness or tension in the belt 16 or a desired degree of slack present in the belt 16, for example zero slack.

When the elastic member 304 is not stretched (i.e., the tension force F is less than the threshold), the belt 16 includes a portion 310 that is inverted upon itself in a first configuration, as shown in FIG. 5A. In the first configuration, an outer surface 312 of the belt 16 is obscured from view of a user. When the tension force F exceeds the threshold, the elastic member 304 stretches to a second configuration shown in FIG. 5B. In the second configuration, portion 310 of the belt 16 is flattened and no longer folded. Thus, the outer surface 312 is viewable by a user. The outer surface 312 may include a visually distinct feature 314 that, when viewed by user, indicates that the belt 16 has achieved the desired tightness or slackness.

Turning to FIGS. 6A-6D, another example of a belt securement verification system is illustrated and indicated by reference number 400. The belt securement verification system 400 includes the belt 16 and a belt securement verification device 402 connected to the belt 16. The belt securement verification device 402 includes a flexible member 404 disposed within a pocket 406 of the belt 16. One or more side openings 408 are disposed in a side edge 410 of the belt 16 and communicate with the pocket 406. The flexible member 404 is a flexible, elastic, or fluid element able to change shape when compressed with a force exceeding a threshold. The threshold corresponds to a desired degree of tightness or tension in the belt 16 or a desired degree of slack present in the belt 16, for example zero slack.

Figure 6A:
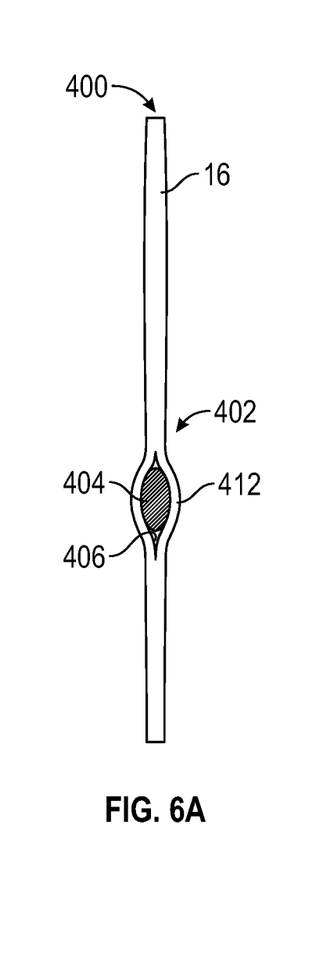
FIG. 6A is a side cross-section view of the belt securement verification system in a first configuration according to a fifth embodiment.
Figure 6B:
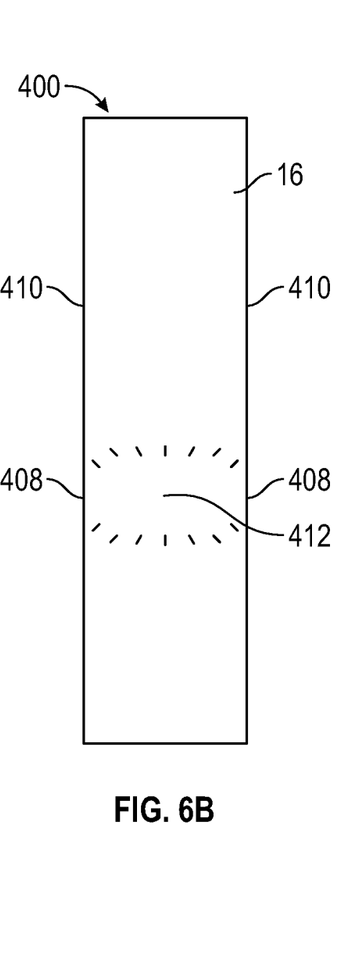
FIG. 6B is a top view of the belt securement verification system in the first configuration according to the fifth embodiment.

When a compressive force on the flexible member 404 is below the threshold, the flexible member 404 is entirely disposed within the pocket 406 in a first configuration, shown in FIGS. 6A and 6B. In the first configuration, the flexible member 404 is not visible by a user and creates a bulge 412 in the belt 16.

Figure 6C:
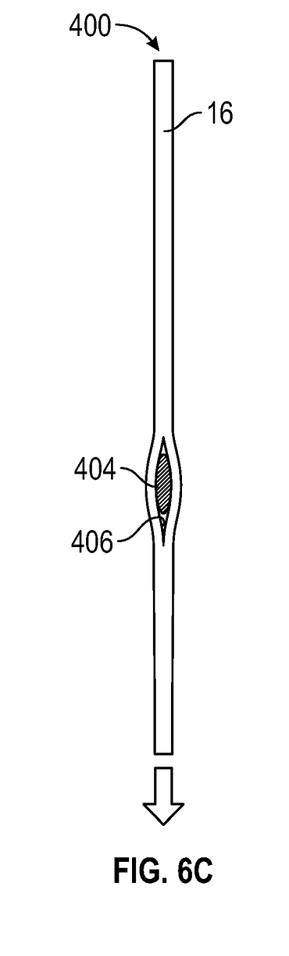
FIG. 6C is a side cross-section view of the belt securement verification system in a second configuration according to the fifth embodiment.
Figure 6D:
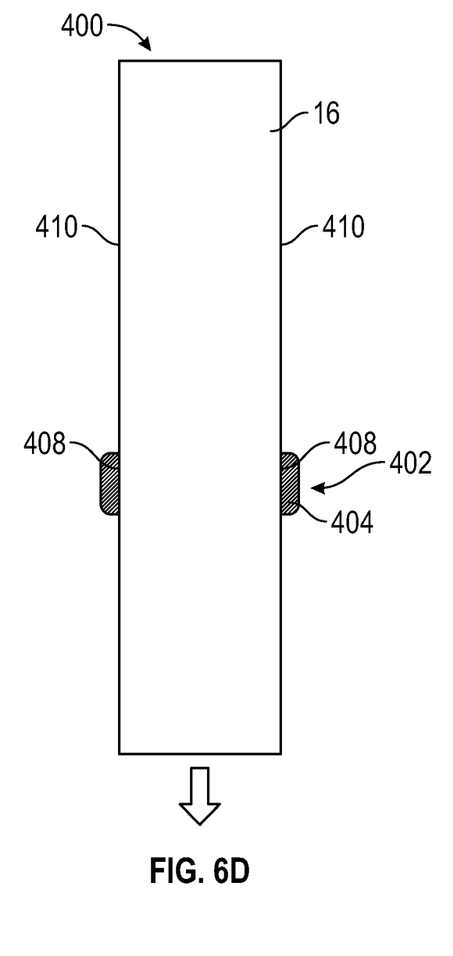
FIG. 6D is a top view of the belt securement verification system in the second configuration according to the fifth embodiment.

When the tension force F is applied to the belt 16, the belt 16 applies a compressive force on the flexible member 404 due to the layers of the belt 16 being drawn together. When the compressive force exceeds the threshold, the flexible member changes shape and extends out from one or both of the side openings 408 in a second configuration, as shown in FIGS. 6C and 6D. In the second configuration, a portion of the flexible member 404 is visible by a user thus indicating that the belt 16 has achieved the desired tightness or slackness.

Figure 7:
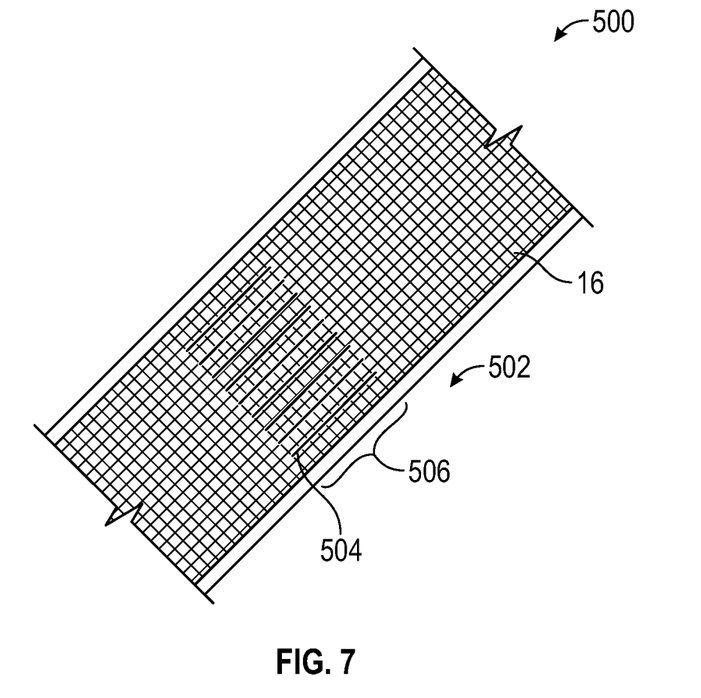
FIG. 7 is a top view of the belt securement verification system according to a sixth embodiment.

Turning to FIG. 7, another example of a belt securement verification system is illustrated and indicated by reference number 500. The belt securement verification system 500 includes the belt 16 and a securement verification device 502 connected to the belt 16. The securement verification device 502 includes mechanophore threads 504 woven into a section 506 of the belt 16. The mechanophore threads 504 are mechanochromic mechanophore materials that are stress or strain activated embedded within a polymeric material. The mechanochromic mechanophore materials mechanophore material is configured to change from a first configuration to a second configuration when the tension force F on the belt 16 exceeds a threshold corresponding to a desired belt tightness or a desired belt slackness. In the first configuration the mechanochromic mechanophore material emits a first wavelength of light, and when in the second configuration the mechanochromic mechanophore material, in response to the tension force F, emits a second wavelength of light different from the first wavelength of light. For example, the first wavelength of light may correspond to red, indicating the desired tightness or slack has not been achieved, while the second wavelength of light may correspond to green, indicating that the desired tightness or slack has been achieved.

Figure 8:
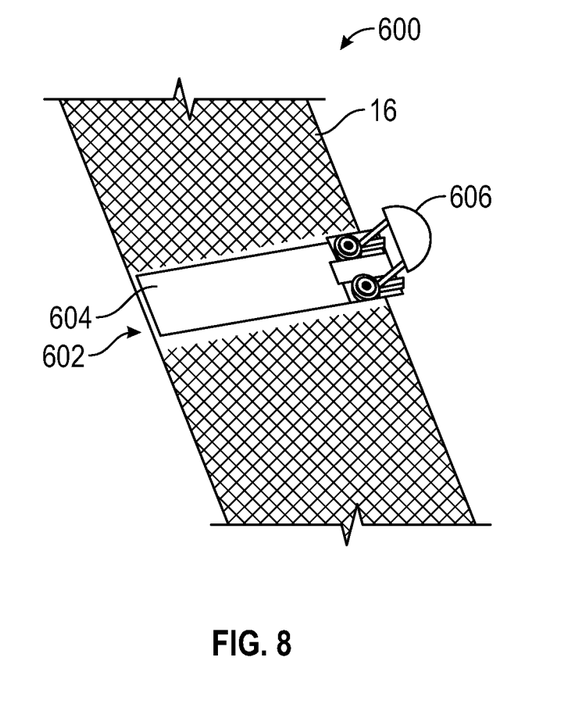
FIG. 8 is a top view of the belt securement verification system according to the seventh embodiment.

Turning to FIG. 8, another example of a belt securement verification system is illustrated and indicated by reference number 600. The belt securement verification system 600 includes the belt 16 and a securement verification device 602 connected to the belt 16. The securement verification device 602 includes a piezoelectric film 604 woven into the belt 16. The piezoelectric film 604 generates an electric current when a stress differential applied across the piezoelectric film 604 exceeds a threshold corresponding to a desired belt tightness or a desired belt slackness. A light emitting diode (LED) 606 is connected to the piezoelectric film 604. When a tension force F on the belt 16 exceeds the threshold, the piezoelectric film 604 generates a current and illuminates the LED 606. Therefore, the LED 606 not being illuminated indicates that the desired tightness or slack has not been achieved. The LED 606 being illuminated indicates that the desired tightness or slack has been achieved.

The belt securement verification systems 10, 100, 200, 300, 400, 500, and 600 provide several advantages. The systems provide objective indications of belt tightness and slack, eliminate false positives, can be placed in strategic locations along the belt to ensure proper tightness and snugness, and can be used in environments to secure delicate or sensitive elements.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A belt securement verification system comprising:
   a belt; and
   a securement verification device connected to the belt, wherein when a tension force on the belt exceeds a threshold corresponding to a desired belt tightness or a desired belt slackness, the securement verification device moves from a first configuration to a second configuration to indicate to a user that the belt has achieved the desired belt tightness or desired belt slackness,
   wherein the securement verification device includes a first opening, a second opening, and a spring disposed between the first opening and the second opening,
   wherein the belt is disposed through the first opening and the second opening, and the spring is configured to move from the first configuration to the second configuration when the tension force on the belt exceeds the threshold corresponding to the desired belt tightness or the desired belt slackness, and
   wherein the first opening is defined by a first frame and the second opening is defined by a second frame, and the spring is connected at one end thereof to the first frame and at another end thereof to the second frame such that the first frame is pivotally coupled to the second frame by the spring.

2. The belt securement verification system of claim 1, wherein the first frame is angled with respect to the second frame when in the first configuration, and the first frame is planar with respect to the second frame when in the second configuration.

3. The belt securement verification system of claim 2, wherein the spring is a helical torsion spring.

4. The belt securement verification system of claim 1, wherein the spring is a beam having an elastic limit point traversal between a concave configuration when in the first configuration and a convex configuration when in the second configuration.

5. A belt securement verification system comprising:
   a belt; and
   a securement verification device connected to the belt, wherein when a tension force on the belt exceeds a threshold corresponding to a desired belt tightness or a desired belt slackness, the securement verification device moves from a first configuration to a second configuration to indicate to a user that the belt has achieved the desired belt tightness or desired belt slackness,
   wherein the securement verification device includes an elastic member disposed within a pocket of the belt and connected at one end thereof to the belt and at another end thereof to the belt, wherein the belt includes a pictograph on an outer surface of the belt between the ends of the elastic member, wherein the elastic member is configured to move from the first configuration to the second configuration when the tension force on the belt exceeds the threshold corresponding to the desired belt tightness or the desired belt slackness, and when in the first configuration the belt is folded to hide the pictograph and when in the second configuration the belt is unfolded to show the pictograph.

6. A belt securement verification system comprising:
a belt; and
a securement verification device connected to the belt, the securement verification device having a first opening, a second opening, and a spring disposed between the first opening and the second opening,
wherein the belt is disposed through the first opening and the second opening, and the spring is configured to move from a first position to a second position when a tension force on the belt exceeds a threshold of the spring corresponding to a desired belt tightness or a desired belt slackness, and
wherein the first opening is defined by a first frame and the second opening is defined by a second frame, and the spring is connected at one end thereof to the first frame and at another end thereof to the second frame such that the first frame is pivotally coupled to the second frame by the spring.

7. The belt securement verification system of claim 6, wherein the first frame is angled with respect to the second frame when in the first position, and the first frame is planar with respect to the second frame when in the second position.

8. The belt securement verification system of claim 7, wherein the belt is disposed overtop the spring.

9. The belt securement verification system of claim 8, wherein the spring is a helical torsion spring.

10. The belt securement verification system of claim 6, wherein the spring is a beam having an elastic limit point traversal between a concave configuration when in the first position and a convex configuration when in the second position.

11. The belt securement verification system of claim 10, wherein the beam is bi-stable.

12. The belt securement verification system of claim 10, wherein the beam is mono-stable.

* * * * *